US012604288B2

(12) United States Patent
Liang et al.

(10) Patent No.: US 12,604,288 B2
(45) Date of Patent: Apr. 14, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Bin Liang, Dongguan (CN); Zhe Fu, Dongguan (CN); Jing Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 550 days.

(21) Appl. No.: 18/147,696

(22) Filed: Dec. 28, 2022

(65) Prior Publication Data

US 2023/0209488 A1      Jun. 29, 2023

Related U.S. Application Data

(63) Continuation of application No. PCT/CN2020/119650, filed on Sep. 30, 2020.

(51) Int. Cl.
*H04W 56/00*          (2009.01)

(52) U.S. Cl.
CPC ............................... *H04W 56/0045* (2013.01)

(58) Field of Classification Search
None
See application file for complete search history.

(56) References Cited

U.S. PATENT DOCUMENTS

| | | | | | |
|---|---|---|---|---|---|
| 8,976,745 | B2 * | 3/2015 | Kwon | ................... | H04L 1/0026 370/476 |
| 10,841,066 | B2 * | 11/2020 | Takeda | ..................... | H04J 11/00 |
| 2003/0039273 | A1 * | 2/2003 | Jang | ..................... | H04J 3/0682 370/328 |
| 2013/0028223 | A1 * | 1/2013 | Kim | ................. | H04W 56/0045 370/329 |
| 2014/0029645 | A1 * | 1/2014 | Yonge, III | .......... | H04L 25/0204 375/144 |
| 2014/0071864 | A1 * | 3/2014 | Seo | ....................... | H04W 52/54 370/294 |

(Continued)

FOREIGN PATENT DOCUMENTS

| | | |
|---|---|---|
| CN | 101753185 | 6/2010 |
| CN | 108353350 | 7/2018 |

(Continued)

OTHER PUBLICATIONS

Qualcomm Incorporated, "Propagation Delay Compensation for Reference Timing Delivery," 3GPP TSG-RAN WG2 Meeting #111-e, R2-2006906, Aug. 2020.

(Continued)

*Primary Examiner* — Wutchung Chu
*Assistant Examiner* — Berhanu D Belete
(74) *Attorney, Agent, or Firm* — Hodgson Russ LLP

(57) ABSTRACT
A wireless communication method, a terminal device, and a network device are provided. In the wireless communication method, a terminal device transmits, on a first uplink channel, first information for a propagation delay compensation (PDC) procedure to a network device.

12 Claims, 7 Drawing Sheets

300

TERMINAL DEVICE                NETWORK DEVICE

S310, FIRST UPLINK CHANNEL
(FIRST INFORMATION)

(56)                References Cited

U.S. PATENT DOCUMENTS

| | | | |
|---|---|---|---|
| 2014/0119351 A1* | 5/2014 | Yonge, III | H04L 25/0204 |
| | | | 370/336 |
| 2015/0230248 A1* | 8/2015 | Kim | H04L 5/0007 |
| | | | 370/329 |
| 2016/0242133 A1* | 8/2016 | Venkob | H04W 74/0833 |
| 2016/0353430 A1* | 12/2016 | Chen | H04W 72/21 |
| 2017/0013610 A1* | 1/2017 | Lee | H04W 72/21 |
| 2017/0142611 A1* | 5/2017 | Andgart | H04W 28/24 |
| 2018/0248797 A1 | 8/2018 | Kim et al. | |
| 2018/0279325 A1* | 9/2018 | Huang | H04W 72/54 |
| 2018/0323938 A1* | 11/2018 | Takeda | H04L 1/1812 |
| 2018/0324102 A1* | 11/2018 | Takahashi | H04L 5/001 |
| 2019/0045468 A1* | 2/2019 | Blasco Serrano | |
| | | | H04W 56/0015 |
| 2019/0394738 A1* | 12/2019 | Abedini | H04W 56/0015 |
| 2020/0137754 A1* | 4/2020 | Kim | H04W 72/21 |
| 2021/0051672 A1* | 2/2021 | Rastegardoost | H04W 72/21 |
| 2021/0219253 A1* | 7/2021 | Van Phan | H04W 56/004 |
| 2022/0039045 A1* | 2/2022 | Sun | H04W 56/0045 |
| 2022/0070808 A1* | 3/2022 | Jacobsen | H04W 56/0035 |
| 2022/0141784 A1* | 5/2022 | Singh | H04W 56/0015 |
| | | | 370/350 |
| 2022/0141786 A1* | 5/2022 | Ruffini | H04W 56/0045 |
| | | | 370/350 |
| 2023/0300917 A1* | 9/2023 | Min | H04W 56/005 |
| | | | 370/328 |

FOREIGN PATENT DOCUMENTS

| | | | |
|---|---|---|---|
| CN | 111565083 | 8/2020 | |
| WO | WO-2017075770 A1 * | 5/2017 | ........... H04W 72/04 |
| WO | 2020145769 | 7/2020 | |
| WO | 2020167013 | 8/2020 | |

OTHER PUBLICATIONS

Oppo, "Consideration on propagation delay compensation for TSC," 3GPP TSG-RAN WG2 Meeting #109 electronic, R2-2000705, Mar. 2020.

Mediatek Inc., "Propagation Delay Compensation by the gNB," 3GPP TSG-RAN2 Meeting #108, R2-1915547 (revision of R2-1913267), Nov. 2019.

WIPO, International Search Report and Written Opinion for International Application No. PCT/CN2020/119650, Jun. 24, 2021.

ZTE Corporation et al., "Enhancements for time synchronization in TSN," 3GPP TSG-RAN WG2 Meeting #111 E-meeting, R2-2006831, Aug. 2020.

EPO, Extended European Search Report for EP Application No. 20955781.8, Oct. 25, 2023.

EPO, Communication for EP Application No. 20955781.8, Jul. 8, 2024.

* cited by examiner

100

300

TERMINAL DEVICE          NETWORK DEVICE

S310, FIRST UPLINK CHANNEL
(FIRST INFORMATION)

UPLINK REFERENCE          T1          DOWNLINK REFERENCE
SIGNAL TX                             SIGNAL RX

TERMINAL
DEVICE

NETWORK
DEVICE
UPLINK REFERENCE          T2          DOWNLINK REFERENCE
SIGNAL RX                             SIGNAL TX

⊠  FIRST INFORMATION

☐  PUSCH

PUSCH

⧄ SCHEDULING INFORMATION (INDICATING TRANSMISSION OF FIRST INFORMATION)

☐ PUSCH

PUSCH

⧄ MAC CE CARRYING FIRST INFORMATION

☐ MAC PDU

400

TERMINAL DEVICE          NETWORK DEVICE

S410, FIRST DOWNLINK CHANNEL (SECOND INFORMATION)

PDSCH

☒ SCHEDULING INFORMATION
(INDICATING TRANSMISSION
OF SECOND INFORMATION)

☐ PDSCH

PDSCH

☒ MAC CE CARRYING SECOND
INFORMATION

☐ MAC PDU

TERMINAL DEVICE 500

COMMUNICATING
UNIT 510

NETWORK DEVICE 600

COMMUNICATING
UNIT 610

NETWORK DEVICE 1000

COMMUNICATING UNIT 1010

TERMINAL DEVICE 1100

COMMUNICATING UNIT 1110

COMMUNICATION DEVICE 700

MEMORY 720

PROCESSOR 710

TRANSCEIVER 730

WIRELESS COMMUNICATION METHOD, TERMINAL DEVICE, AND NETWORK DEVICE

CROSS-REFERENCE TO RELATED APPLICATION(S)

This application is a continuation of International Application No. PCT/CN2020/119650, filed Sep. 30, 2020, the entire disclosure of which is incorporated herein by reference.

TECHNICAL FIELD

This disclosure relates to the field of communication, and specifically to a wireless communication method, a terminal device, and a network device.

BACKGROUND

In order for an industrial internet of things (HOT) system to support transmission of services, such as factory automation, transport industry, electrical power distribution, etc., in a communication system, the concept of time sensitive networking (TSN) is introduced. In a TSN system, the communication system acts as a TSN bridge to serve nodes in the TSN system regarding clock synchronization and service transmission. Therefore, low delay and high clock-synchronization accuracy are required for the communication system. To this end, realization of high-accuracy time synchronization between a network and a terminal to meet requirements of TSN services is a problem to be solved.

SUMMARY

In a first aspect, a wireless communication method is provided. The method includes the following. A terminal device transmits, on a first uplink channel, first information for a propagation delay compensation (PDC) procedure to a network device.

In a second aspect, a terminal device is provided. The terminal device includes a transceiver, a processor and a memory. The memory is configured to store computer programs. The processor is configured to invoke and execute the computer programs stored in the memory, to perform the method described in the first aspect or in various implementations of the first aspect.

In a third aspect, a network device is provided. The network device includes a transceiver, a processor and a memory. The memory is configured to store computer programs. The processor is configured to invoke and execute the computer programs stored in the memory, to cause the transceiver to transmit, on a first downlink channel, second information for a propagation delay compensation (PDC) procedure to a terminal device.

DETAILED DESCRIPTION

Figure 1:
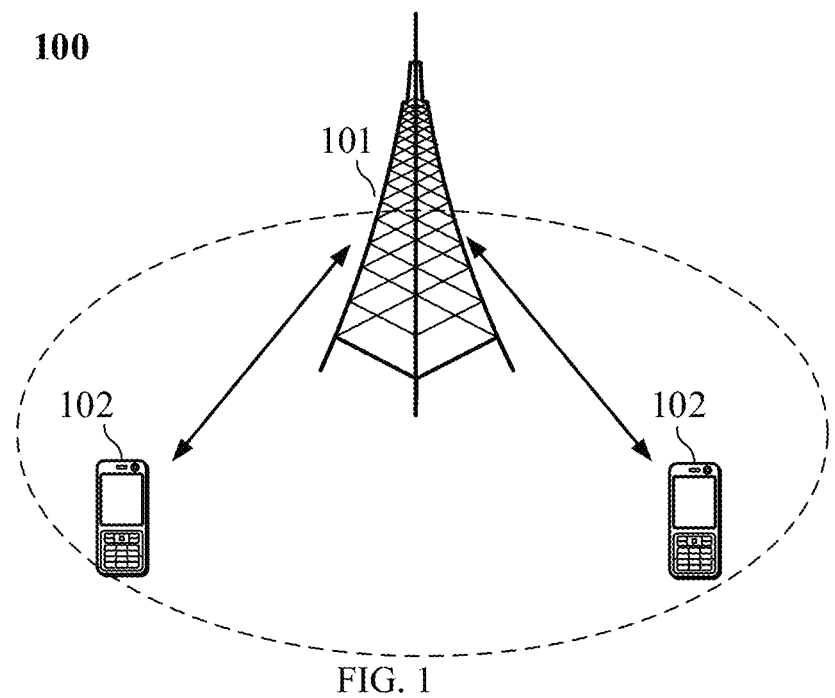
FIG. 1 is a schematic diagram illustrating an application scenario provided in implementations of the disclosure.

The following will describe technical solutions of implementations of the disclosure with reference to the accompanying drawings in implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

Technical solutions of implementations of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a 5th generation (5G) communication system, or other communication systems, etc.

A conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication, etc. Implementations of the disclosure can also be applied to these communication systems.

Optionally, a communication system in implementations of the disclosure may be applied to a carrier aggregation (CA) scenario, a dual connectivity (DC) scenario, or a standalone (SA) network deployment scenario.

Optionally, the communication system in implementations of the disclosure is applicable to an unlicensed spectrum, and an unlicensed spectrum may be regarded as a shared spectrum. Or the communication system in implementations of the disclosure is applicable to a licensed spectrum, and a licensed spectrum may be regarded as a non-shared spectrum.

Various implementations of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc.

The terminal device may be a station (ST) in a WLAN, a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

In implementations of the disclosure, the terminal device can be deployed on land, which includes indoor or outdoor, handheld, wearable, or in-vehicle. The terminal device can also be deployed on water (such as ships, etc.). The terminal device can also be deployed in the air (such as airplanes, balloons, satellites, etc.).

In implementations of the disclosure, the terminal device can be a mobile phone, a pad, a computer with wireless transceiver functions, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

By way of explanation rather than limitation, in implementations of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In implementations of the disclosure, the network device may be a device configured to communicate with a mobile device, and the network device may be an access point (AP) in a WLAN, a base transceiver station (BTS) in GSM or CDMA, may also be a Node B (NB) in WCDMA, and may also be an evolutional Node B (eNB or eNodeB) in LTE, or a relay station or AP, or an in-vehicle device, a wearable device, a network device (g-Node B (gNB)) in an NR network, or a network device in a future evolved PLMN, etc.

By way of explanation rather than limitation, in implementations of the disclosure, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station deployed on land or water.

In implementations of the disclosure, the network device provides services for a cell, and the terminal device communicates with the network device on a transmission resource (for example, a frequency-domain resource or a spectrum resource) for the cell. The cell may be a cell corresponding to the network device (for example, a base station). The cell may correspond to a macro base station, or may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

Exemplarily, FIG. 1 illustrates a communication system 100 to which implementations of the disclosure are applied. The communication system 100 may include a network device 101. The network device 101 may be a device that can communicate with a terminal device 102 (also referred to as "communication terminal" or "terminal"). The network device 101 can provide a communication coverage for a specific geographical area and communicate with terminal devices in the coverage area.

FIG. 1 exemplarily illustrates one network device and two terminal devices. Optionally, the communication system 100 may also include multiple network devices, and there can be other quantities of terminal devices in a coverage area of each of the network devices. Implementations of the disclosure are not limited in this regard.

Optionally, the communication system 100 may further include other network entities such as a network controller, a mobile management entity, or the like, and implementations of the disclosure are not limited in this regard.

It should be understood that, in implementations of the disclosure, a device with communication functions in a network/system can be referred to as a "communication device". Taking the communication system 100 illustrated in FIG. 1 as an example, the communication device may include the network device 101 and the terminal device(s) 102 that have communication functions. The network device 101 and the terminal device(s) 102 can be the devices described above and will not be elaborated again herein. The communication device may further include other devices such as a network controller, a mobile management entity, or other network entities in the communication system 100, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

It should be understood that, "indication" referred to in implementations of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that that there is an association relationship between A and B.

In the elaboration of implementations of the disclosure, the term "correspondence" may mean that there is a direct or indirect correspondence between the two, may mean that there is an association between the two, or may mean a relationship of indicating and indicated or configuring and configured, etc.

In implementations of the disclosure, in order for an industrial interne of things (IIOT) system to support transmission of services, such as factory automation, transport industry, electrical power distribution, etc., in a 5G system, the concept of time sensitive network (TSN) or time sensitive control (TSC) is introduced. In a TSN system, the communication system 100 acts as a TSN bridge to serve nodes in the TSN system regarding clock synchronization and service transmission. Therefore, low delay and high clock-synchronization accuracy are required for the communication system 100.

Figure 2:
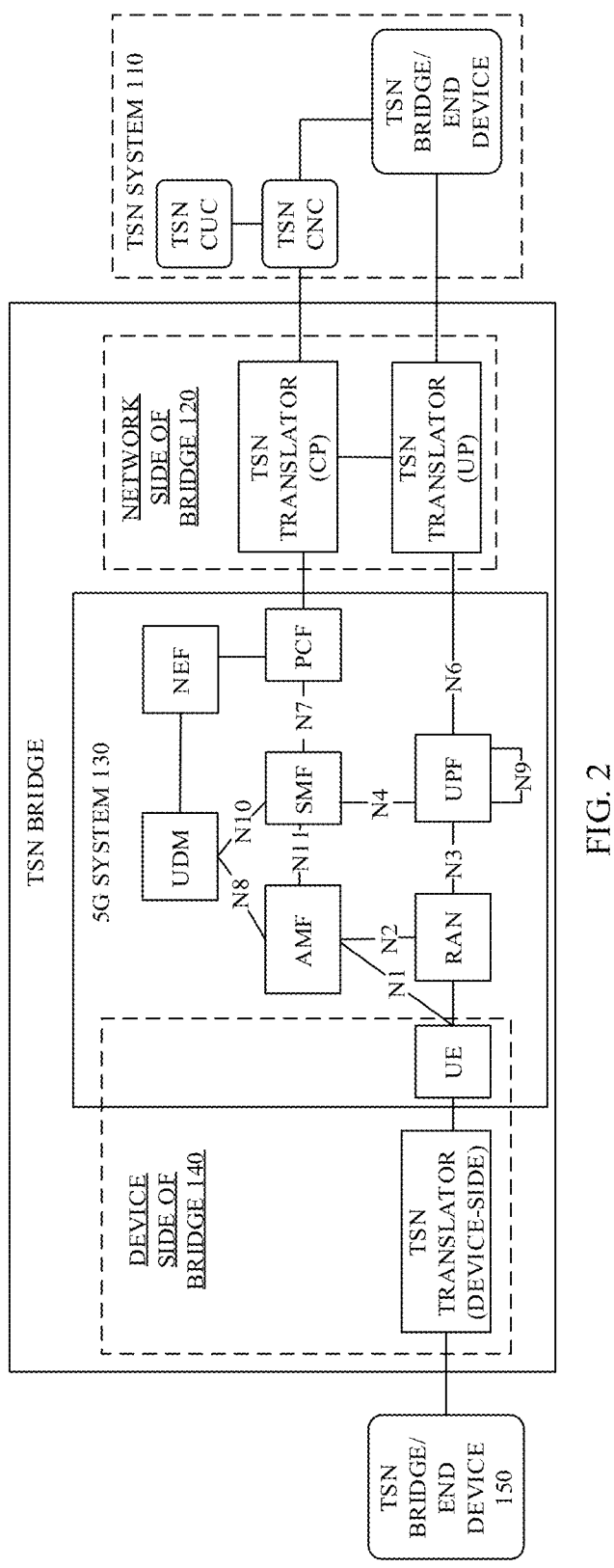
FIG. 2 is a network architectural diagram illustrating a time sensitive network (TSN) network integrated with a 5th generation (5G) network to act as a TSN bridge.

FIG. 2 is a network architectural diagram illustrating a TSN network integrated with a 5G network to act as a TSN bridge. The network includes a TSN system 110, a network side of bridge 120, a 5G system 130, a device side of bridge 140, and a TSN bridge/end device 150.

The TSN system 110 includes one centralized user configuration (CUC), one centralized network configuration (CNC), and at least one TSN bridge/end device. The TSN system 110 is connected with the network side of bridge 120.

The network side of bridge 120 includes a control plane (CP) TSN translator and a user plane (UP) TSN translator. An application function (AF) acts as the control plane TSN translator, and the control plane TSN translator is in a communication connection with the CNC in the TSN system 110. The user plane TSN translator is in a communication connection with the TSN bridge/end device in the TSN system 110.

The 5G system 130 includes a core network, a radio access network (RAN), and a terminal. A user plane of the core network includes a user plane function (UPF). A control plane of the core network includes a unified data management (UDM), a network exposure function (NEF), an access and mobility management function (AMF) entity, a session management function (SMF), and a policy control function (PCF).

N1 interface is a reference point between the terminal and the AMF. N2 interface is a reference point between the RAN and the AMF, and is used for non-access stratum (NAS) message transmission, etc. N3 interface is a reference point between the RAN and the UPF, and is used for transmission of user plane data, etc. N4 interface is a reference point between the SMF and the UPF, and is used for transmission of, for example, a tunnel identifier, data-buffering indication information, and a downlink-data notification message, etc. of an N3 connection. N6 interface is a reference point between the UPF and the user plane TSN translator, and is used for transmission of user plane data, etc. N8 is a reference point between the UDM and the AMF. N10 is a reference point between the UDM and the SMF. N11 is a reference point between the AMF and the SMF.

The device side of bridge 140 is in a communication connection with the terminal in the 5G system 130. The device side of bridge 140 includes a device-side TSN translator. The device side of bridge 140 is also in a communication connection with the TSN bridge/end device 150.

As illustrated in FIG. 2, in the TSN network, the 5G system 130 is a path for transmitting TSN services. Therefore, the 5G system is required to support TSN service transmission, and meet time-synchronization requirements of the TSN network and can transmit services within a required time. In this regard, the 5G system 130 is required to have low delay and high clock-synchronization accuracy, such that during transmission of a factory automation service in the 5G network, the operation and connection of each point in a mechanical operation are accurate and meet time requirements.

In the 5G system, a TSN time is indicated by a reference time information (referenceTimeInfo-r16) field in system information block (SIB) signaling. The reference time information field contains a system frame number, absolute time information, etc. and has an indication granularity of 10 nanoseconds (ns).

Based on requirements of TSN service transmission, when transmitting a TSN service over 5G, it is necessary to satisfy time-synchronization precision of 1 microsecond ($\mu s$). As illustrated in FIG. 2, from the perspective of an air interface, whether the precision of 1 $\mu s$ can be satisfied depends on a time-synchronization accuracy notified by a network and an error (delta $\Delta$) in time-synchronization accuracy at a UE side. A synchronization error of a terminal side is determined by RANI and is related to various factors such as propagation loss, device restrictions, etc. Therefore, how to realize high-accuracy time synchronization between a network and a terminal to meet requirements of TSN services is a problem to be solved.

Figures 3, 4, 5:
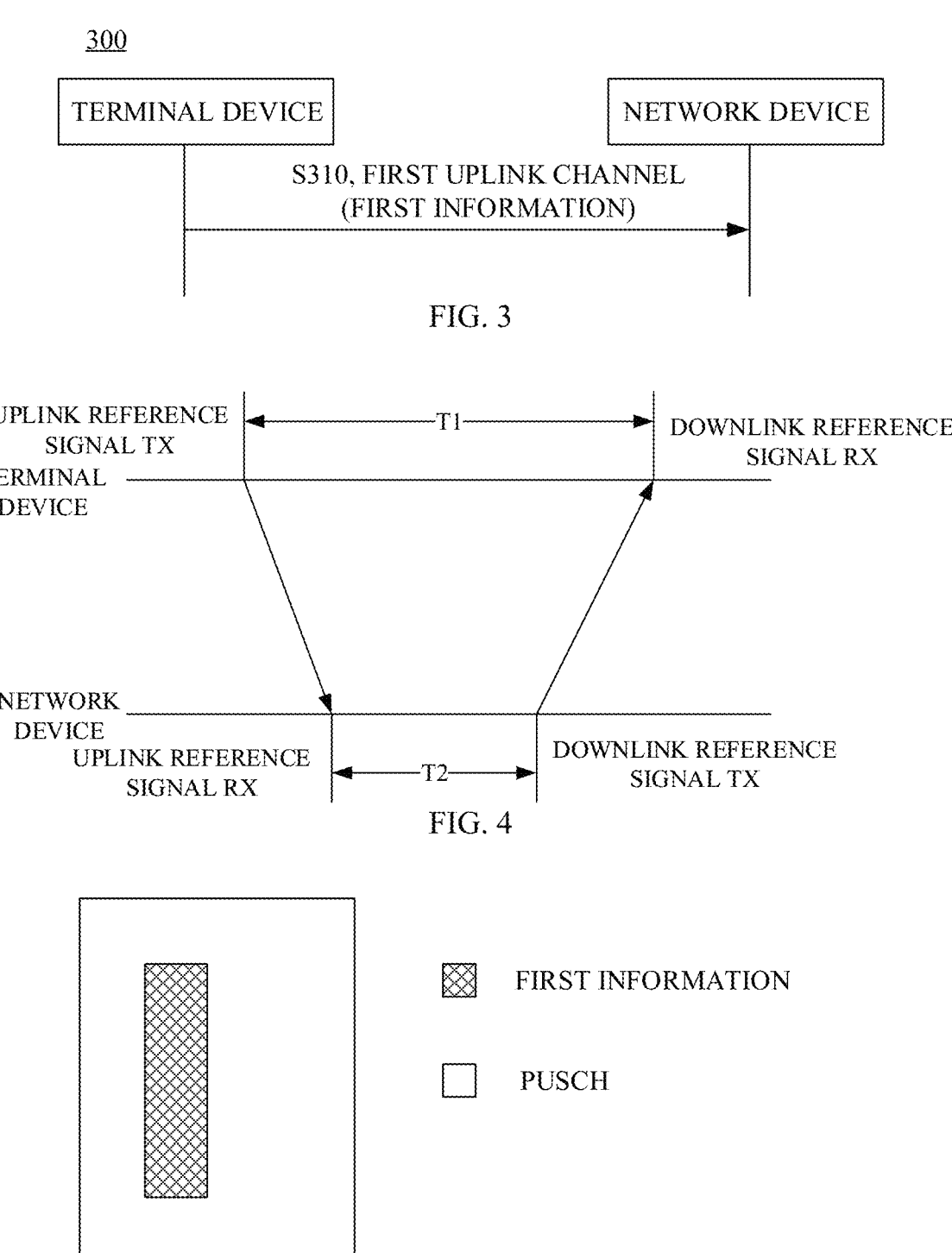
FIG. 3 is a schematic diagram of a wireless communication method provided in implementations of the disclosure.
FIG. 4 is a schematic diagram illustrating determination of a round trip time (RTT) based on reception (RX)-transmission (TX).
FIG. 5 to FIG. 7 are schematic diagrams illustrating transmission modes of first information on a physical uplink shared channel (PUSCH).

FIG. 3 is a schematic flowchart of a wireless communication method 300 provided in implementations of the disclosure. The method 300 may be implemented by the terminal device in the communication system illustrated in FIG. 1. As illustrated in FIG. 3, the method 300 may include at least some of the following operations.

S310, a terminal device transmits, on a first uplink channel, first information for a propagation delay compensation (PDC) procedure to a network device.

Accordingly, the network device receives the first uplink channel, and obtains the first information from the first uplink channel, thereby performing the PDC procedure according to the first information.

Optionally, the first information may include any information for the PDC procedure. For example, the first information may be used for determining a PDC quantity for the PDC procedure.

Optionally, in some implementations, the PDC may be determined based on reception (RX)-transmission (TX) positioning.

As illustrated in FIG. 4, a round trip time (RTT) between the terminal device and the network device can be determined through transmission and reception of reference signals.

Specifically, the terminal device can transmit an uplink reference signal to the network device, and the network device can receive the uplink reference signal transmitted by the terminal device. The network device can transmit a downlink reference signal to the terminal device, and the terminal device can receive the downlink reference signal transmitted by the network device. The terminal device can determine first time-interval information T1 according to a transmission time of the uplink reference signal and a reception time of the downlink reference signal. The network device can determine second time-interval information T2 according to a reception time of the uplink reference signal and a transmission time of the downlink reference signal.

Optionally, in some implementations, the first information may include the first time-interval information T1 and reference time information corresponding to the first time-interval information T1.

Optionally, the reference time information may be, for example, an absolute time such as year/month/day/hour/minute/second/milliseconds, or may be other time identifiers such as a slot index.

Optionally, in other implementations, the PDC may be determined based on a timing advance (TA). In this case, the first information may include the TA.

In some implementations, the first information may include a PDC value determined by the terminal device, that is, the terminal device can transmit the PDC value directly to the network device.

As an example, the PDC value can be determined according to the first time-interval information T1 and the second time-interval information T2, for example, the PDC value is (T1−T2)/2.

As another example, the PDC value can be determined according to the TA, for example, the PDC value is TA/2.

It should be understood that, the contents of the first information described above are merely examples, and the first information may include other auxiliary information for the PDC procedure in practice. The disclosure is not limited in this regard.

The following will describe in detail transmission modes of the first information on the first uplink channel.

In some implementations, the first uplink channel may be a physical uplink control channel (PUCCH) or a physical uplink shared channel (PUSCH), or may be other uplink channels. The disclosure is not limited in this regard.

In addition, if the first information is transmitted on a PUCCH, the PUCCH may be transmitted using a first PUCCH format. Optionally, the first PUCCH format may be a format dedicated for transmitting the first information, that is, a PUCCH of the first PUCCH format is used for transmitting information for the PDC procedure.

When configuring the first PUCCH format, the number of transmission bits in the first PUCCH format and a PUCCH resource corresponding to the first PUCCH format may be configured. In addition, the corresponding PUCCH resource may be used for transmitting a PUCCH of the first PUCCH format.

Optionally, the first PUCCH format contains an indicator bit, and the indicator bit indicates that the first PUCCH format is used for carrying information for the PDC procedure.

In other implementations, when transmitting the first information on a PUCCH, the PUCCH is transmitted using a second PUCCH format, where the second PUCCH format is a format for transmitting uplink control information (UCI). In other words, information for the PDC procedure and UCI may be transmitted using the same PUCCH format.

The following will describe in detail transmission modes of the first information when using a PUSCH to transmit the first information.

As an implementation, the first information is multiplexed with the PUSCH for transmission.

FIG. 5 is a schematic diagram illustrating a transmission mode of multiplexing the first information with the PUSCH.

In this implementation, a part of a resource for the PUSCH may be used for transmitting the first information, while the remaining part of the resource for the PUSCH may be used for transmitting the PUSCH.

As another implementation, data transmitted on the PUSCH includes the first information.

In other words, the first information may be transmitted on the PUSCH as a data portion of the PUSCH.

Figures 6, 7, 8:
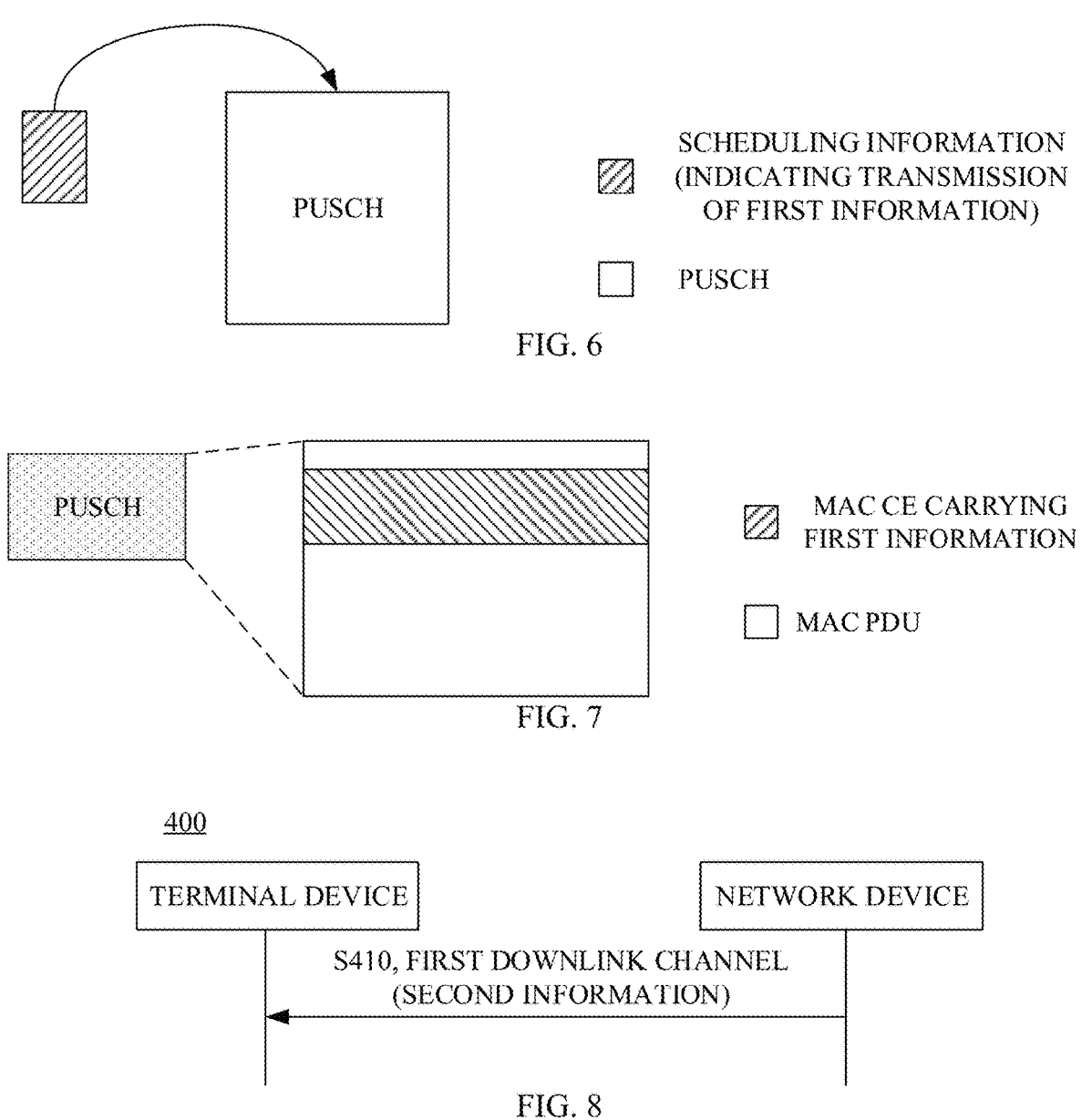
FIG. 8 is a schematic diagram of a wireless communication method provided in implementations of the disclosure.

Optionally, in some implementations, as illustrated in FIG. 6, scheduling information corresponding to the PUSCH includes first indication information, and the first indication information indicates that the PUSCH is used for transmitting the first information. In other words, the scheduling information corresponding to the PUSCH can include the first indication information to indicate that the PUSCH scheduled this time is dedicated for transmitting information for the PDC procedure.

It should be understood that, there is no limitation on an encapsulation mode of the first information in the PUSCH in implementations of the disclosure.

As an example, the first information is carried in radio resource control (RRC) signaling, and the RRC signaling is transmitted on the PUSCH.

As another example, the first information is carried in a media access control-control element (MAC CE) in a MAC protocol data unit (PDU), and the MAC PDU is transmitted on the PUSCH.

FIG. 7 is a schematic diagram illustrating a mode of carrying the first information in the MAC CE in the MAC PDU.

Therefore, in implementations of the disclosure, the terminal device can transmit, on the first uplink channel, auxiliary information for the PDC procedure to the network device, such that the network device can perform the PDC procedure according to the first information, which is beneficial to high-accuracy time synchronization between a network and a terminal.

With the above technical solutions, the terminal device can transmit, on the first uplink channel, auxiliary information for the PDC procedure to the network device, or the network device can transmit, via the first downlink channel, auxiliary information for the PDC procedure to the terminal device, such that the network device or the terminal device can perform the PDC procedure according to the auxiliary information received, which is conducive to high-accuracy time synchronization between a network and a terminal.

FIG. 8 is a schematic flowchart of a wireless communication method 400 according to other implementations of the disclosure. The method 400 may be implemented by the network device in the communication system illustrated in FIG. 1. As illustrated in FIG. 8, the method 400 includes the following.

S410, a network device transmits, on a first downlink channel, second information for a PDC procedure to a terminal device.

Accordingly, the terminal device receives the first downlink channel, and obtains the second information from the first downlink channel, thereby performing the PDC procedure according to the second information.

Optionally, the second information may include any information for the PDC procedure. For example, the second information may be used for determining a PDC quantity for the PDC procedure.

Optionally, in some implementations, the PDC may be determined based on RX-TX positioning. As illustrated in FIG. 4, an RTT between the terminal device and the network device can be determined through transmission and reception of reference signals. For the detailed procedure, reference can be made to the related elaborations in the foregoing implementations, which will not be elaborated again herein for the sake of brevity.

Optionally, in some implementations, the second information may include second time-interval information T2 and reference time information corresponding to the second time-interval information T2.

Optionally, the reference time information may be, for example, an absolute time such as year/month/day/hour/minute/second/milliseconds, or may be other time identifiers such as a slot index.

Optionally, in other implementations, the PDC may be determined based on a TA. In this case, the second information may include the TA.

In some implementations, the second information may include a PDC value determined by the network device, that is, the network device can transmit the PDC value directly to the terminal device.

As an example, the PDC value can be determined according to first time-interval information T1 and the second time-interval information T2, for example, the PDC value is $(T1-T2)/2$.

As another example, the PDC value can be determined according to the TA, for example, the PDC value is TA/2.

It should be understood that, the contents of the second information described above are merely examples, and the second information may include other auxiliary information for the PDC procedure in practice. The disclosure is not limited in this regard.

The following will describe in detail transmission modes of the second information on the first downlink channel.

In some implementations, the first downlink channel may be a physical downlink control channel (PDCCH) or a physical downlink shared channel (PDSCH), or may be other downlink channels. The disclosure is not limited in this regard.

In addition, if the second information is transmitted on a PDCCH, the PDCCH may be transmitted using a first PDCCH format or a first downlink control information (DCI) format. Optionally, the first PDCCH format or the first DCI format may be a format dedicated for transmitting the second information, that is, a PDCCH of the first PDCCH format or the first DCI format is used for transmitting information for the PDC procedure.

When configuring the first PDCCH format, the number of transmission bits in the first PDCCH format and a PDCCH resource corresponding to the first PDCCH format may be configured. In addition, the corresponding PDCCH resource may be used for transmitting a PDCCH of the first PDCCH format.

Optionally, the first PDCCH format contains an indicator bit, and the indicator bit indicates that the first PDCCH format is used for carrying information for the PDC procedure.

In implementations of the disclosure, the first PDCCH format is used for carrying the second information of one terminal device. Or the first PDCCH format is used for carrying the second information corresponding to each of multiple terminal devices. Or the first PDCCH format is used for carrying the second information corresponding to each terminal-device group of multiple terminal-device groups.

In implementations of the disclosure, the first downlink channel may carry one piece of second information, or may carry multiple pieces of second information, where the multiple pieces of second information may correspond to multiple terminal devices or correspond to multiple terminal-device groups. The disclosure is not limited in this regard.

The following will describe in detail transmission modes of the second information when using a PDSCH to transmit the second information.

As an implementation, data transmitted on the PDSCH includes the second information.

In other words, the second information may be transmitted on the PDSCH as a data portion of the PDSCH.

Figures 9, 10, 11, 12:
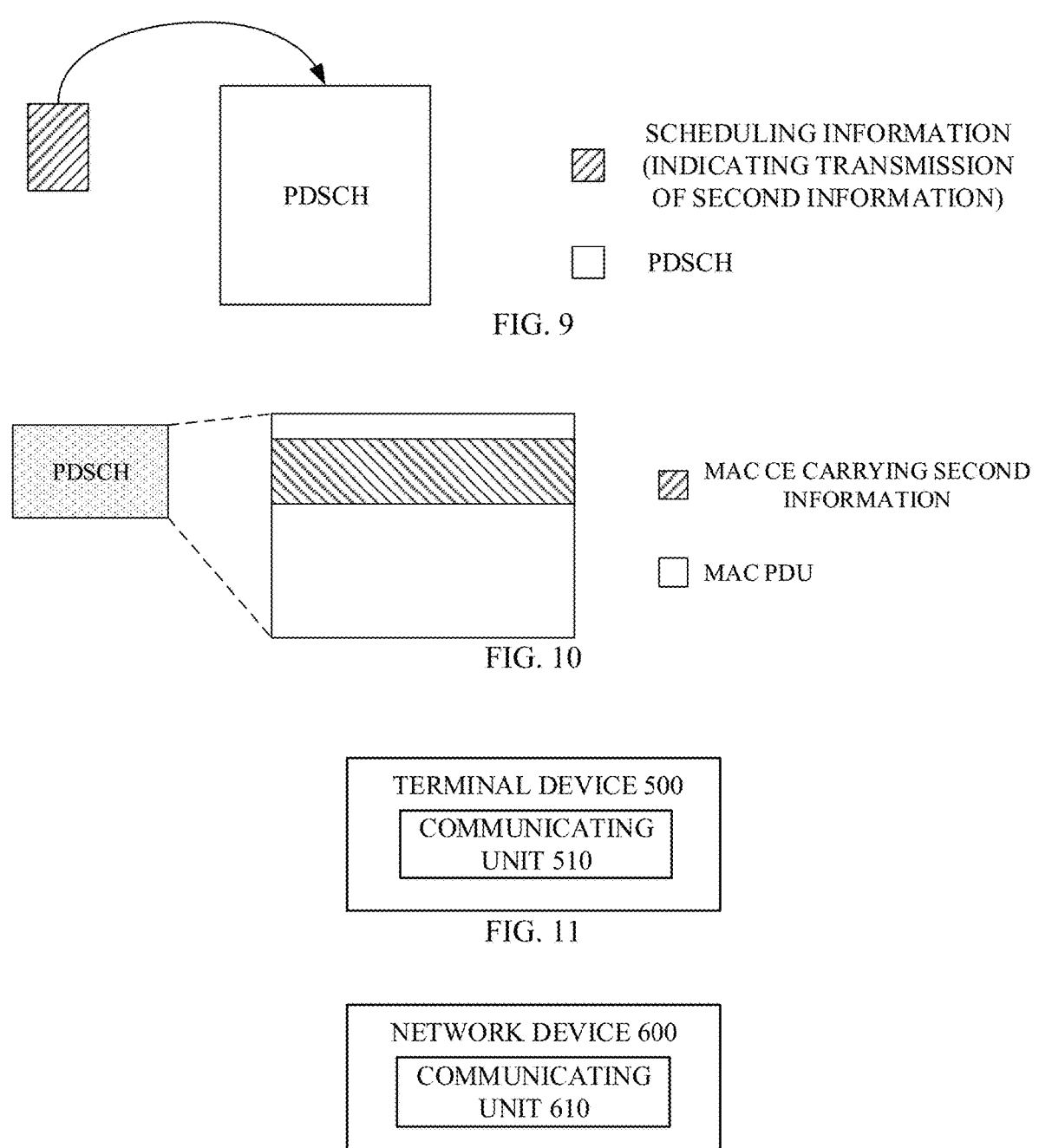
FIG. 9 to FIG. 10 are schematic diagrams illustrating transmission modes of second information on a physical downlink shared channel (PDSCH).
FIG. 11 is a schematic block diagram of a terminal device provided in implementations of the disclosure.
FIG. 12 is a schematic block diagram of a network device provided in implementations of the disclosure.

Optionally, in some implementations, as illustrated in FIG. 9, scheduling information corresponding to the PDSCH includes second indication information, and the second indication information indicates that the PDSCH is used for transmitting the second information. In other words, the scheduling information corresponding to the PDSCH can include the second indication information to indicate that the PDSCH scheduled this time is dedicated for transmitting information for the PDC procedure.

It should be understood that, there is no limitation on an encapsulation mode of the second information in the PDSCH.

As an example, the second information is carried in RRC signaling, and the RRC signaling is transmitted on the PDSCH.

As another example, the second information is carried in a MAC CE in a MAC PDU, and the MAC PDU is transmitted on the PDSCH.

FIG. 10 is a schematic diagram illustrating a mode of carrying the second information in the MAC CE in the MAC PDU.

Therefore, in implementations of the disclosure, the network device can transmit, on the first downlink channel, auxiliary information for the PDC procedure to the terminal device, such that the terminal device can perform the PDC procedure according to the second information, which is beneficial to high-accuracy time synchronization between a network and a terminal.

Method implementations of the disclosure have been described in detail above with reference to FIG. 3 to FIG. 10. The following will elaborate apparatus implementations of the disclosure with reference to FIG. 11 to FIG. 14. It should be understood that, apparatus implementations and method implementations correspond to each other. For similar elaborations, reference can be made to the method implementations.

FIG. 11 is a schematic block diagram of a terminal device 500 according to implementations of the disclosure. As illustrated in FIG. 11, the terminal device 500 includes a communicating unit 510. The communicating unit 510 is configured to transmit, on a first uplink channel, first information for a PDC procedure to a network device.

Optionally, in some implementations, the first uplink channel is a PUCCH.

Optionally, in some implementations, the PUCCH is transmitted using a first PUCCH format, and the first PUCCH format is a format dedicated for transmitting the first information.

Optionally, in some implementations, the first PUCCH format contains an indicator bit, and the indicator bit indicates that the first PUCCH format is used for carrying the first information.

Optionally, in some implementations, the PUCCH is transmitted using a second PUCCH format, and the second PUCCH format is a format for transmitting UCI.

Optionally, in some implementations, the first uplink channel is a PUSCH.

Optionally, in some implementations, the first information is multiplexed with the PUSCH for transmission.

Optionally, in some implementations, data transmitted on the PUSCH includes the first information.

Optionally, in some implementations, scheduling information corresponding to the PUSCH includes first indication information, and the first indication information indicates that the PUSCH is used for transmitting the first information.

Optionally, in some implementations, the first information is carried in RRC signaling, and the RRC signaling is transmitted on the PUSCH.

Optionally, in some implementations, the first information is carried in a MAC CE in a MAC PDU, and the MAC PDU is transmitted on the PUSCH.

Optionally, in some implementations, the first information includes first time-interval information and reference time information corresponding to the first time-interval information. The first time-interval information is determined according to a transmission time of an uplink reference signal and a reception time of a downlink reference signal.

Optionally, in some implementations, the first information includes a TA.

Optionally, in some implementations, the communicating unit above may be a communication interface or a transceiver, or may be an input-output interface of a communication chip or system-on-chip (SOC).

It should be understood that, the terminal device 500 according to implementations of the disclosure may correspond to the terminal device in the method implementations of the disclosure, and the above and other operations and/or functions of various units of the terminal device 500 are respectively intended for implementing corresponding operations of the terminal device in the method 300 illustrated in FIG. 3 to FIG. 7, which will not be repeated herein for the sake of simplicity.

FIG. 12 is a schematic block diagram of a network device according to implementations of the disclosure. The network device 600 illustrated in FIG. 12 includes a communicating unit 610. The communicating unit 610 is configured to transmit, on a first downlink channel, second information for a PDC procedure to a terminal device.

Optionally, in some implementations, the first downlink channel is a PDCCH.

Optionally, in some implementations, the PDCCH is transmitted using a first PDCCH format, and the first PDCCH format is a format dedicated for transmitting the second information.

Optionally, in some implementations, the first PDCCH format contains an indicator bit, and the indicator bit indicates that the first PDCCH format is used for carrying the second information.

Optionally, in some implementations, the first PDCCH format is used for carrying the second information of one terminal device. Or the first PDCCH format is used for carrying the second information corresponding to each of multiple terminal devices. Or the first PDCCH format is used for carrying the second information corresponding to each terminal-device group of multiple terminal-device groups.

Optionally, in some implementations, the first downlink channel is a PDSCH.

Optionally, in some implementations, data transmitted on the PDSCH includes the second information.

Optionally, in some implementations, scheduling information corresponding to the PDSCH includes second indication information, and the second indication information indicates that the PDSCH is used for transmitting the second information.

Optionally, in some implementations, the second information is carried in RRC signaling, and the RRC signaling is transmitted on the PDSCH.

Optionally, in some implementations, the second information is carried in a MAC CE in a MAC PDU, and the MAC PDU is transmitted on the PDSCH.

Optionally, in some implementations, the second information includes second time-interval information and reference time information corresponding to the second time-interval information. The second time-interval information is determined according to a reception time of an uplink reference signal and a transmission time of a downlink reference signal.

Optionally, in some implementations, the second information includes a TA.

Optionally, in some implementations, the communicating unit above may be a communication interface or a transceiver, or may be an input-output interface of a communication chip or SOC.

It should be understood that, the network device 600 according to implementations of the disclosure may correspond to the network device in the method implementations of the disclosure, and the above and other operations and/or functions of various units of the network device 600 are respectively intended for implementing corresponding operations of the network device in the method 400 illustrated in FIG. 8 to FIG. 10, which will not be repeated herein for the sake of simplicity.

Figure 13:
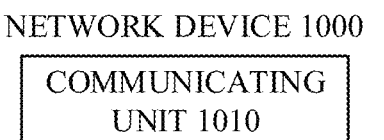
FIG. 13 is a schematic block diagram of another network device provided in implementations of the disclosure.

FIG. 13 is a schematic block diagram of a network device according to other implementations of the disclosure. The network device 1000 illustrated in FIG. 13 includes a communicating unit 1010. The communicating unit 1010 is configured to receive first information for a PDC procedure transmitted on a first uplink channel by a terminal device.

Optionally, in some implementations, the first uplink channel is a PUCCH.

Optionally, in some implementations, the PUCCH is transmitted using a first PUCCH format, and the first PUCCH format is a format dedicated for transmitting the first information.

Optionally, in some implementations, the first PUCCH format contains an indicator bit, and the indicator bit indicates that the first PUCCH format is used for carrying the first information.

Optionally, in some implementations, the PUCCH is transmitted using a second PUCCH format, and the second PUCCH format is a format for transmitting UCI.

Optionally, in some implementations, the first uplink channel is a PUSCH.

Optionally, in some implementations, the first information is multiplexed with the PUSCH for transmission.

Optionally, in some implementations, data transmitted on the PUSCH includes the first information.

Optionally, in some implementations, scheduling information corresponding to the PUSCH includes first indication information, and the first indication information indicates that the PUSCH is used for transmitting the first information.

Optionally, in some implementations, the first information is carried in RRC signaling, and the RRC signaling is transmitted on the PUSCH.

Optionally, in some implementations, the first information is carried in a MAC CE in a MAC PDU, and the MAC PDU is transmitted on the PUSCH.

Optionally, in some implementations, the first information includes first time-interval information and reference time information corresponding to the first time-interval information. The first time-interval information is determined according to a transmission time of an uplink reference signal and a reception time of a downlink reference signal.

Optionally, in some implementations, the first information includes a TA.

Optionally, in some implementations, the communicating unit above may be a communication interface or a transceiver, or may be an input-output interface of a communication chip or SOC.

It should be understood that, the network device 1000 according to implementations of the disclosure may correspond to the network device in the method implementations of the disclosure, and the above and other operations and/or functions of various units of the network device 1000 are respectively intended for implementing corresponding operations of the network device in the method 300 illustrated in FIG. 3 to FIG. 7, which will not be repeated herein for the sake of simplicity.

Figure 14:
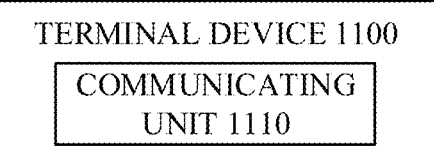
FIG. 14 is a schematic block diagram of another terminal device provided in implementations of the disclosure.

FIG. 14 is a schematic block diagram of a terminal device according to other implementations of the disclosure. The terminal device 1100 illustrated in FIG. 14 includes a communicating unit 1110. The communicating unit 1110 is configured to receive second information for a PDC procedure transmitted on a first downlink channel by a network device.

Optionally, in some implementations, the first downlink channel is a PDCCH.

Optionally, in some implementations, the PDCCH is transmitted using a first PDCCH format, and the first PDCCH format is a format dedicated for transmitting the second information.

Optionally, in some implementations, the first PDCCH format contains an indicator bit, and the indicator bit indicates that the first PDCCH format is used for carrying the second information.

Optionally, in some implementations, the first PDCCH format is used for carrying the second information of one terminal device. Or the first PDCCH format is used for carrying the second information corresponding to each of multiple terminal devices. Or the first PDCCH format is used for carrying the second information corresponding to each terminal-device group of multiple terminal-device groups.

Optionally, in some implementations, the first downlink channel is a PDSCH.

Optionally, in some implementations, data transmitted on the PDSCH includes the second information.

Optionally, in some implementations, scheduling information corresponding to the PDSCH includes second indication information, and the second indication information indicates that the PDSCH is used for transmitting the second information.

Optionally, in some implementations, the second information is carried in RRC signaling, and the RRC signaling is transmitted on the PDSCH.

Optionally, in some implementations, the second information is carried in a MAC CE in a MAC PDU, and the MAC PDU is transmitted on the PDSCH.

Optionally, in some implementations, the second information includes second time-interval information and reference time information corresponding to the second time-interval information. The second time-interval information is determined according to a reception time of an uplink reference signal and a transmission time of a downlink reference signal.

Optionally, in some implementations, the second information includes a TA.

Optionally, in some implementations, the communicating unit above may be a communication interface or a transceiver, or may be an input-output interface of a communication chip or SOC.

It should be understood that, the terminal device 1100 according to implementations of the disclosure may correspond to the terminal device in the method implementations of the disclosure, and the above and other operations and/or functions of various units of the terminal device 1100 are respectively intended for implementing corresponding operations of the terminal device in the method 400 illustrated in FIG. 8 to FIG. 10, which will not be repeated herein for the sake of simplicity.

Figure 15:
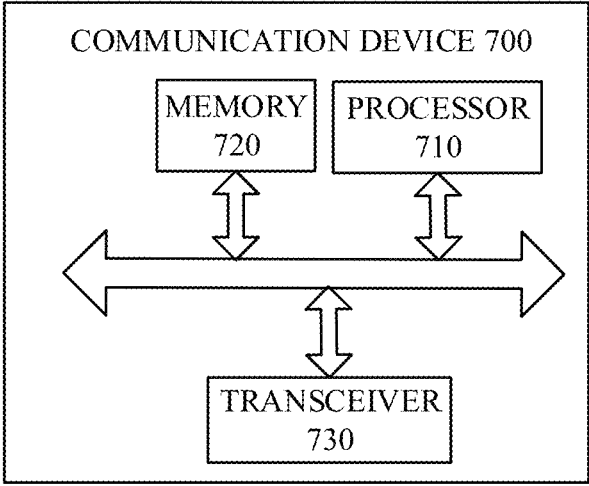
FIG. 15 is a schematic block diagram of a communication device provided in implementations of the disclosure.

FIG. 15 is a schematic structural diagram of a communication device 700 provided in implementations of the disclosure. The communication device 700 illustrated in FIG. 15 includes a processor 710. The processor 710 can invoke and execute computer programs stored in a memory, to perform the method in implementations of the disclosure.

Optionally, as illustrated in FIG. 15, the communication device 700 may further include the memory 720. The processor 710 can invoke and execute the computer programs stored in the memory 720, to perform the method in implementations of the disclosure.

The memory 720 may be a separate device independent of the processor 710, or may be integrated into the processor 710 of the disclosure.

Optionally, as illustrated in FIG. 15, the communication device 700 can further include a transceiver 730. The processor 710 can control the transceiver 730 to communicate with other devices, specifically, to transmit information or data to other devices or to receive information or data transmitted by other devices.

The transceiver 730 may include a transmitter and a receiver. The transceiver 730 may further include an antenna, where one or more antennas can be provided.

Optionally, the communication device 700 may be operable as the network device in implementations of the disclosure, and the communication device 700 can implement the operations performed by the network device in various methods in implementations of the disclosure, which will not be repeated herein for the sake of simplicity.

Optionally, the communication device 700 may be operable as the mobile terminal/the terminal device in implementations of the disclosure, and the communication device 700 can implement the operations performed by the mobile terminal/the terminal device in various methods in implementations of the disclosure, which will not be repeated herein for the sake of simplicity.

Figure 16:
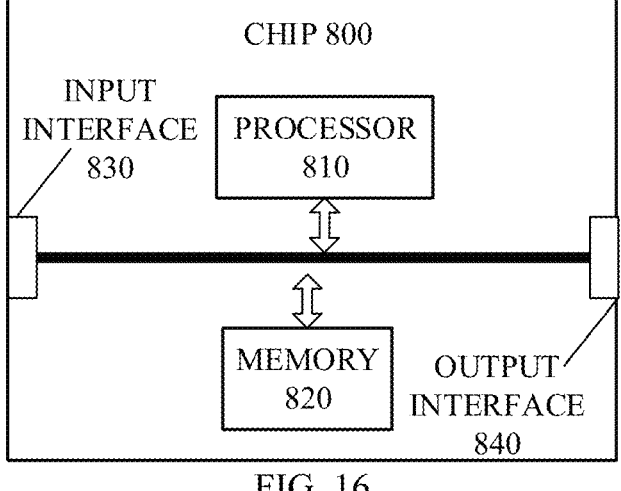
FIG. 16 is a schematic block diagram of a chip provided in implementations of the disclosure.

FIG. 16 is a schematic structural diagram of a chip according to implementations of the disclosure. The chip 800 illustrated in FIG. 16 includes a processor 810. The processor 810 can invoke and execute computer programs stored in a memory to perform the method in implementations of the disclosure.

Optionally, as illustrated in FIG. 16, the chip 800 further includes the memory 820. The processor 810 can invoke and execute the computer programs stored in the memory 820 to perform the method in implementations of the disclosure.

The memory 820 may be a separate device independent of the processor 810, or may be integrated into the processor 810.

Optionally, the chip 800 may further include an input interface 830. The processor 810 can control the input interface 830 to communicate with other devices or chips, specifically, to obtain information or data transmitted by other devices or chips.

Optionally, the chip 800 may further include an output interface 840. The processor 810 can control the output interface 840 to communicate with other devices or chips, specifically, to output information or data to other devices or chips.

Optionally, the chip is applicable to the network device in implementations of the disclosure. The chip can implement the operations performed by the network device in various methods in implementations of the disclosure, which will not be repeated herein for the sake of simplicity.

Optionally, the chip is applicable to the mobile terminal/the terminal device in implementations of the disclosure. The chip can implement the operations performed by the mobile terminal/the terminal device in various methods in implementations in the disclosure, which will not be repeated herein for the sake of simplicity.

It should be understood that, the chip referred to in implementations of the disclosure may also be referred to as an SOC.

Figure 17:
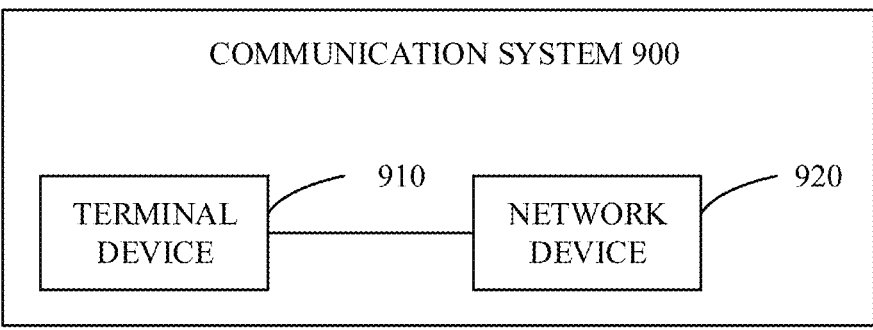
FIG. 17 is a schematic block diagram of a communication system provided in implementations of the disclosure.

FIG. 17 is a schematic block diagram of a communication system 900 provided in implementations of the disclosure. As illustrated in FIG. 17, the communication system 900 includes a terminal device 910 and a network device 920.

The terminal device 910 can implement functions of the terminal device in the foregoing methods, and the network device 920 can implement functions of the network device in the foregoing methods, which will not be repeated herein for the sake of simplicity.

It should be understood that, the processor in implementations of the disclosure may be an integrated circuit chip with signal processing capabilities. During implementation, each step of the foregoing method implementations may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations of the disclosure can be implemented or executed. The general purpose processor may be a microprocessor, or the processor may be any conventional processor or the like. The steps of the method disclosed in implementations of the disclosure may be directly implemented by a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM). It should be noted that, the memory of the systems and methods described in the disclosure is intended to include, but is not limited to, these and any other suitable types of memory.

It should be understood that, the memory above is intended for illustration rather than limitation. For example, the memory in implementations of the disclosure may also be an SRAM, a DRAM, an SDRAM, a DDR SDRAM, an ESDRAM, an SLDRAM, a DR RAM, etc. In other words, the memory in implementations of the disclosure is intended to include, but is not limited to, these and any other suitable types of memory.

Implementations of the disclosure further provide a computer-readable storage medium. The computer-readable storage medium is configured to store computer programs.

Optionally, the computer-readable storage medium is applicable to the network device of implementations of the disclosure. The computer programs are operable with a computer to implement the operations performed by the network device in various methods in implementations of the disclosure, which will not be repeated herein for the sake of simplicity.

Optionally, the computer-readable storage medium is applicable to the mobile terminal/the terminal device of implementations of the disclosure. The computer programs are operable with a computer to implement the operations performed by the mobile terminal/the terminal device in various methods in implementations of the disclosure, which will not be repeated herein for the sake of simplicity.

Implementations of the disclosure further provide a computer program product. The computer program product includes computer program instructions.

Optionally, the computer program product is applicable to the network device of implementations of the disclosure. The computer program instructions are operable with a computer to implement the operations performed by the network device in various methods in implementations of the disclosure, which will not be repeated herein for the sake of simplicity.

Optionally, the computer program product is applicable to the mobile terminal/the terminal device of implementations of the disclosure. The computer program instructions are operable with a computer to implement the operations performed by the mobile terminal/the terminal device in various methods in implementations of the disclosure, which will not be repeated herein for the sake of simplicity.

Implementations of the disclosure further provide a computer program.

Optionally, the computer program is applicable to the network device of implementations of the disclosure. The computer program, when executed by a computer, is operable with the computer to implement the operations performed by the network device in various methods in implementations of the disclosure, which will not be repeated herein for the sake of simplicity.

Optionally, the computer program is applicable to the mobile terminal/the terminal device of implementations of the disclosure. The computer program, when executed by a computer, is operable with the computer to implement the operations performed by the mobile terminal/the terminal device in various methods in implementations of the disclosure, which will not be repeated herein for the sake of simplicity.

Those of ordinary skill in the art will appreciate that units and algorithmic operations of various examples described in connection with implementations of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the specific working processes of the foregoing systems, apparatuses, and units, reference can be made to the corresponding processes in the foregoing method implementations, which will not be repeated herein.

It will be appreciated that the systems, apparatuses, and methods disclosed in implementations of the disclosure may also be implemented in various other manners. For example, the above apparatus implementations are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various implementations of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations of the disclosure. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A wireless communication method, comprising:
transmitting on a first uplink channel, by a terminal device, first information for a propagation delay compensation (PDC) procedure to a network device, wherein the first uplink channel is a physical uplink control channel (PUCCH), the PUCCH is transmitted using a first PUCCH format, the first PUCCH format is a format dedicated for transmitting the first information, and the first PUCCH format contains an indicator bit, and the indicator bit indicates that the first PUCCH format is used for carrying the first information;
wherein the first information is used for determining PDC amount;
wherein the first information comprises:
first time-interval information, wherein the first time-interval information is determined according to a transmission time of an uplink reference signal and a reception time of a downlink reference signal; and
reference time information corresponding to the first time-interval information.

2. The method of claim 1, wherein the first information comprises a timing advance (TA).

3. The method of claim 1, wherein the first PUCCH format is configured with PUCCH resources and transmission bits in advance.

4. The method of claim 1, wherein PDC is determined based on RX-TX positioning.

5. A network device, comprising:
a transceiver;
a processor; and
a memory storing computer programs which, when executed by the processor, are operable with the processor to:
cause the transceiver to transmit, on a first downlink channel, second information for a propagation delay compensation (PDC) procedure to a terminal device, wherein the first downlink channel is a physical downlink control channel (PDCCH), the PDCCH is transmitted using a first PDCCH format, the first PDCCH format is a format dedicated for transmitting the second information, and the first PDCCH format contains an indicator bit, and the indicator bit indicates that the first PDCCH format is used for carrying the second information;
wherein the second information is used for determining PDC amount;
wherein the second information comprises:
second time-interval information, wherein the second time-interval information is determined according to a reception time of an uplink reference signal and a transmission time of a downlink reference signal; and
reference time information corresponding to the second time-interval information.

6. The network device of claim 5, wherein:
the first downlink channel is a PDCCH, the first PDCCH format is used for carrying the second information of one terminal device;

the first PDCCH format is used for carrying the second information corresponding to each of a plurality of terminal devices; or the first PDCCH format is used for carrying the second information corresponding to each terminal-device group of a plurality of terminal-device groups.

7. The network device of claim 6, wherein the first PDCCH format is configured with PDCCH resources and transmission bits in advance.

8. The network device of claim 6, wherein PDC is determined based on RX-TX positioning.

9. The network device of claim 5, wherein the second information comprises a timing advance (TA).

10. A terminal device, comprising:

a transceiver;

a processor; and a memory storing computer programs which, when executed by the processor, are operable with the processor to: cause the transceiver to transmit, on a first uplink channel, first information for a propagation delay compensation (PDC) procedure to a network device, wherein the first uplink channel is a physical uplink control channel (PUCCH), the PUCCH is transmitted using a first PUCCH format, the first PUCCH format is a format dedicated for transmitting the first information, the first PUCCH format contains an indicator bit, and the indicator bit indicates that the first PUCCH format is used for carrying the first information;

wherein the first information is used for determining PDC amount;

wherein the first information comprises:

first time-interval information, wherein the first time-interval information is determined according to a transmission time of an uplink reference signal and a reception time of a downlink reference signal; and reference time information corresponding to the first time-interval information.

11. The terminal device of claim 10, wherein the first information comprises a timing advance (TA).

12. The terminal device of claim 10, wherein the first PUCCH format is configured with PUCCH resources and transmission bits in advance.

* * * * *